US000001338H

United States Statutory Invention Registration [19]

[11] Reg. Number: H1338

Chin

[43] Published: Jul. 5, 1994

[54] OILED POLYMER AND PROCESS FOR THE PRODUCTION THEREOF

[75] Inventor: Steven S. Chin, Houston, Tex.

[73] Assignee: Shell Oil Company, Houston, Tex.

[21] Appl. No.: 816,508

[22] Filed: Dec. 31, 1991

[51] Int. Cl.[5] ..... C08K 5/02

[52] U.S. Cl. ..... 524/379; 524/502; 524/534

[58] Field of Search ..... 524/534

[56] References Cited

U.S. PATENT DOCUMENTS

| | | | |
|---|---|---|---|
| 3,870,676 | 3/1975 | Condon | 260/33.6 |
| 3,932,328 | 1/1976 | Korpman | 260/27 |
| 3,935,338 | 1/1976 | Robertson et al. | 427/207 |
| 3,954,692 | 5/1976 | Downey | 260/33.6 |
| 3,992,339 | 11/1976 | Harlan et al. | 260/27 |
| 4,286,077 | 8/1981 | St. Clair et al. | 524/505 |
| 4,377,647 | 3/1983 | Durbin et al. | 523/518 |
| 4,399,249 | 8/1983 | Bildusas | 524/271 |
| 4,419,494 | 12/1983 | Puletti et al. | 525/95 |
| 4,500,021 | 2/1985 | Bildusas | 225/49 |
| 4,551,490 | 11/1985 | Doyle et al. | 524/22 |
| 4,619,851 | 10/1986 | Sasaki et al. | 428/40 |
| 4,728,572 | 3/1988 | Davis | 428/355 |
| 4,743,497 | 5/1988 | Thorsrud | 428/286 |
| 4,833,193 | 5/1989 | Sieverding | 524/486 |

FOREIGN PATENT DOCUMENTS

| | | |
|---|---|---|
| 850131 | 1/1976 | Belgium . |
| 0234615 | 9/1987 | European Pat. Off. . |
| 3305724A | 2/1983 | Fed. Rep. of Germany . |

OTHER PUBLICATIONS

KRATON ® Thermoplastic Rubber in Asphalt Products, Technical Bulletin, Shell Chem. Co., SC:57-84, Feb. 1985.

*Primary Examiner*—Shean Wu

[57] ABSTRACT

Oiled SIS polymers and processes for their production are disclosed. These processes result in advantages including reduced mixing time and less shear degradation. An adhesive composition comprising the oiled polymer of the invention is also disclosed.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OILED POLYMER AND PROCESS FOR THE PRODUCTION THEREOF

BACKGROUND OF THE INVENTION

Adhesive compositions are very well known. Generally, these compositions comprise of a thermoplastic elastomer, such as a styrenic block copolymer, a tackifying resin and a processing oil. Adhesives are generally produced either by dissolving all the ingredients in a common solvent capable of dissolving all the ingredients or by a hot melt process where the ingredients are melt processed at an elevated temperature.

During the production of adhesives, the polymer, tackifying resin and oil can be added as separate ingredients or the polymer and oil can be premixed then added together with the resin. When separate addition is utilized, the polymer is referred to as a neat or unoiled polymer. A common problem is that the neat polymer is difficult to mix, resulting in longer mixing times. Long mixing times is a disadvantage in the production of adhesives whether from solvent or hot melt process. In hot melt mixes in particular, if the mixing time is long the copolymer degrades during melt processing to generate lower molecular weight species. This degradation occurs due to the presence of oxygen, and due to shear degradation of the high viscosity copolymers. If the resulting degradation is severe, the resulting adhesive is no longer useful for the intended application.

Presoaking the polymer in oil or premixing the oil and polymer prior to their use in producing adhesives are alternative methods which are known in the art. However, these methods have not been utilized in the production of adhesives based on styrene-isoprene-styrene (SIS) block copolymer. One reason for this is that SIS block copolymers are too soft for handling. Thus, addition of oil prior to processing makes these block copolymer excessively tacky. Another reason is that with presoaking, an extra step is involved or required.

Thus, there continues to exist a need for improved methods of processing oiled SIS polymers in order to facilitate the production of good quality SIS polymer based adhesive compositions.

SUMMARY OF THE INVENTION

This invention provides an oiled styrene-isoprene-styrene (SIS) based copolymer comprising from about 5 to 50 parts of oil.

This invention further provides processes for producing the inventive oiled styrene-isoprene-styrene (SIS) based copolymer. These processes include a solvent process, and non-solvent processes wherein oil and neat SIS block copolymer are premixed or are added separately into a batch or continuous mixer.

The invention also provides an adhesive composition comprising a tackifying resin and an oiled styrene-isoprene-styrene (SIS) based block copolymer comprising from about 5 to 50 parts of oil. Optionally, depending on its intended application(s), predetermined additional amounts of oil can be added to the adhesive composition.

The advantages of the inventive processes include a reduction in mixing time which reduces the amount of time the styrenic block copolymer in the adhesive is exposed to the thermo-oxidative environment thereby reducing polymer degradation. Also, the presence of oil in the polymer reduces shear degradation during melt processing.

DETAILED DESCRIPTION OF THE INVENTION

In very general terms, the basic materials that are useful in the practice of this invention are a thermoplastic elastomer, an oil, and a tackifying resin.

Thermoplastic elastomers useful herein include those based on poly α-olefins, polyesteramides, polyether, polyurethane, polystyrene, polybutadiene, and polyisoprene.

Preferred among this group are block copolymers comprising of homopolymers or copolymers of conjugated dienes or copolymers of one or more conjugated dienes and one or more monoalkenyl aromatic hydrocarbons. These block copolymers are manufactured and sold by Shell Chemical Company as KRATON ® thermoplastic polymers. A more detailed description of these types of polymers can be found, for example, in U.S. Pat. No. 3,935,338; particularly from col. 2, line 52 to col. 3, line 24. The disclosure of this patent is herein incorporated by reference.

Particularly preferred among the block copolymers are the styrenic block copolymers commonly referred to as SBS (styrene-butadiene-styrene), SIS (styrene-isoprene-styrene), and SEBS (styrene-ethylene-butylene-styrene). Most particularly preferred are the SIS copolymers.

These SIS block copolymers comprise an elastomeric center block derived from isoprene, i.e. polymerized from isoprene either alone or in conjunction with a small proportion of other monomers; and thermoplastic A-blocks (end-blocks) derived from styrene, i.e. polymerized from styrene or styrene homologues. The individual A-blocks have a number average molecular weight of at least 7,000 preferably in the range of about 10,000 to 30,000 and the A-blocks constitute from about 8 to 40 and preferably about 12 to 30 percent by weight of the block copolymer. Commercial products of SIS block copolymers include KRATON ® 1107, 1111, AND 1125. KRATON ® 1107 is well known and is described in U.S. Pat. No. 3,932,328. KRATON ® D1111 generally comprises about 20 to 24 percent by weight of the A block and has a solution viscosity of about 1300 centipoise at 25% wt solids in toluene at room temperature. KRATON ® D1125 generally comprises about 28 to 32 percent by weight of the A block and the polymer possesses a solution viscosity of about 300 centipoise at 25% wt. solids in toluene at room temperature.

Commercial compositions comprising oiled SBS and SEBS are known. Because of the aforementioned problems, oiled SIS polymer has not been used to produce adhesive compositions.

Generally speaking, all tackifying resins useful in adhesive compositions are suitable in the practice of this invention. An exemplary listing of such tackifying resins can be found at Col. 4, lines 18–37 of U.S. Pat. No. 4,286,077 which is herein incorporated by reference.

Very broadly speaking, all oils are useful in the practice of this invention. More specifically, oils that are particularly useful herein are those that are used as plasticizers in adhesives based on styrenic block copolymers. Such oils have a solubility parameter close to that of the rubber block, in this case isoprene, and have a high molecular weight to minimize compatibility with the polystyrene endblock phase.

These oils are exemplified by aromatic oils, mineral oils, naphthenic oils, paraffinic oils, and low softening point tackifying resins. Naphthenic oils are more compatible with SIS polymers than paraffinic oils. More highly refined aromatic-free "white oils" such as Tufflo 6056 a tradename of ARCO and mineral oils such as Kaydol a tradename of Witco are preferred for long term melt and color stability of the adhesive. Naphthenic oils with low aromatic content such as SHELLFLEX® 371 (a trademark of Shell Chemical Company) which combine the characteristics of high compatibility, affecting plasticizing and low cost are ideally suited for use with styrenic block copolymers such as SIS polymers.

The compositions of this invention may also contain additional materials including antioxidants, fillers, pigments, and the like. Antioxidants useful herein include phenolic and secondary antioxidants. A representative listing of those antioxidants can be found at col. 3, lines 15 to 49 of U.S. Pat. No. 4,728,572 which is herein incorporated by reference. Fillers, pigments, and like materials that are conventionally used and known in the art are likewise useful in the practice of this invention.

There are, at least, three different embodiments of the process of making the oiled polymer component of this invention. In one embodiment, the polymer is made in solvent, then oil is added to the solvent, and the solvent is subsequently removed using art-known conventional devices. In a second embodiment, the oil and polymer can be premixed and then metered into a continuous or batch mixer for compounding. In a third embodiment, the oil and polymer can be added separately into the batch or continuous mixer.

In general, any of the solvents known in the prior art to be useful in the preparation of adhesives may be used as the solvent in the first embodiment. Such a solvent is one that is capable of dissolving all of the ingredients of the adhesive and evaporating after the adhesive is completely formulated. Suitable solvents having this characteristic include straight- and branched-chain hydrocarbons such as pentane, hexane, heptane, octane and the like, as well as alkyl-substituted derivatives thereof: cycloaliphatic hydrocarbons such as cyclopentane, cyclohexane, cycloheptane and the like, as well as alkyl-substituted derivatives thereof; aromatic and alkyl-substituted aromatic hydrocarbons such as benzene, toluene, xylene and the like; hydrogenated aromatic hydrocarbons, such as tetralin, decalin and the like. Linear and cyclic ethers such as dimethyl ether, methyl ethyl ether, tetrahydrofuran and the like may be used in small amounts.

Regardless of the method of making the oiled polymer, the amount of oil that is incorporated into the polymer is generally within the range of from about 5 to 50 parts. A preferred amount of oil in the polymer is from about 10 to 30 parts.

The oiled polymer is then used in the production of an adhesive composition. The adhesive composition can be made using any art-known method such as the hot melt or the solvent method. These methods are disclosed in for example, U.S. Pat. No. 4,728,572 which is herein incorporated by reference.

The adhesive composition comprises of a tackifying resin, an oiled polymer comprising a predetermined amount of oil, and conventional additives such as antioxidants. It is to be noted that for some applications, the adhesive composition may be required to contain more oil than is present in the oiled polymer. In such instances, additional oil will be added during the production of the adhesive composition. Generally speaking though, such end-product applications and the necessary adjustments in the amounts of oil, is considered to be within the competence of one skilled in the art.

In numeric terms, the adhesive composition generally comprises:

For the polymer about 100 parts;

For the oil, from about 5 to 100, preferably from 10 to 60 parts;

For the tackifying resin, from about 50–300, preferably from 100–250 parts; and

For the antioxidant from about 0.05 to 2.0 parts.

The invention is further described by the following non-limiting examples.

EXAMPLE 1

An SIS polymer (KRATON® D1111) was anionically polymerized using cyclohexane as solvent. After the completion of anionic polymerization, 33 phr of SHELLFLEX® 371 oil was metered into the solvent-/polymer blend and thoroughly mixed. After mixing, the solvent was removed by melt devolatilization to produce dense pellets of SIS oiled polymers.

EXAMPLE 2

An SIS polymer (KRATON® D1107) was polymerized using the method of Example 1. The polymer and 11 phr of SHELLFLEX® 371 oil were dry blended together in a Henschel mixer. After 10 minutes of mixing in the Henschel mixer, the dry blend was fed into a twin screw extruder for further mixing and pelletization. The mixing and exit temperatures at the extruder were 180° C. and 200° C., respectively. The pellets formed contained SIS oiled polymer.

EXAMPLE 3

An SIS polymer (KRATON® D1125) was polymerized using the method of Example 1. The polymer was fed directly into the throat of a twin screw extruder and 25 phr of SHELLFLEX® 371 oil was injected directly into the extruder. After melt mixing in the twin screw extruder, the oiled polymer was pelletized to form dense pellets.

EXAMPLE 4

The usefulness of oiled SIS-type polymers in melt mixing is demonstrated in the reduction in total mixing time when compared to the mixing of neat, unoiled polymers. Table 1 compares the torque and mixing times of adhesive produced from neat, unoiled polymers to those produced from oiled polymers where the final adhesive composition was 100 phr SIS polymer, 187 phr 105° C. softening point hydrogenated tackifying resin (Escorez 5300), 47 phr oil (SHELLFLEX® 371), and 3 phr phenolic antioxidant (Irganox 1010). Mixing was conducted on a Brabender Prep Mixer with a 250 cc mixing capacity. The Prep mixer was equipped with a torque rheometer capable of determining the mixing torque as a function of mix time. The total mix time was determined as the time between initial softening of ingredients (fluxing) which is indicated by the minimum torque and the maximum torque when mixing is complete. The mixer temperature was set at 195° C. and the adhesive mix temperature ranged from 135° C. at initial softening or "fluxing" of ingredients to a final adhesive mix temperature of 180° C. As illustrated in Table 1, the total mixing time for the adhesives made with the inventive oiled polymers is reduced by as much as 50%.

TABLE 1

| Mixing Time Reduction | Torque (N-m) | | |
|---|---|---|---|
| | Minimum | Maximum | Total Mix Time (Min) |
| KRATON ® D1107 | 22 | 98 | 11 |
| 11 phr oiled KRATON ® D1107 | 25 | 99 | 8 |
| KRATON ® D1125 | 18 | 46 | 12 |
| 25 phr oiled RP-6405 | 32 | 47 | 8 |
| KRATON ® D1111 | 49 | 84 | 25 |
| 21 phr oiled KRATON ® D1111 | 37 | 93 | 14 |
| 33 phr oiled KRATON ® D1111 | 43 | 93 | 12 |

While this invention has been described in detail for the purpose of illustration, it is not to be construed as limited thereby but is intended to cover all changes and modifications within the spirit and scope thereof.

That which is claimed is:

1. An oiled polymer comprising a styrene-isoprene-styrene block copolymer and from about 5 to 50 parts of oil.

2. A polymer as in claim 1 wherein said oil is selected from the group consisting of mineral oils, naphthenic oils, paraffinic oils, and low softening point tackifying resins.

3. A polymer as in claim 1 wherein said oil is a naphthenic oil.

4. A polymer as in claim 3 wherein said naphthenic oil is one with a low aromatic content.

5. A polymer as in claim 1 wherein said oil is present in an amount of from 10 to 30 parts.

6. A process for preparing the oiled polymer of claim 1 comprising the steps of:

(a) polymerizing neat SIS block copolymer in a solvent;

(b) adding from about 5 to 50 parts of oil to (a) and to form the oiled polymer;

(c) removing the solvent from the oiled polymer.

7. A process for preparing the oiled polymer of claim 1 comprising the steps of:

(a) premixing oil and neat SIS copolymer to form a premixed oiled polymer; and (b) metering the product of (a) into a continuous or batch mixer for compounding.

8. A process for preparing the oiled polymer of claim 1 comprising separately adding oil and neat SIS copolymer into a batch or continuous mixer.

9. An adhesive composition comprising the oiled polymer of claim 1 and at least one tackifying resin.

10. A composition as in claim 9 further comprising predetermined additional amounts of oil.

11. A polymer as in claim 1 wherein said styrene-isoprene block copolymer is present in an amount of from about 14–32 wt %.

12. A polymer as in claim 11 wherein said styrene-isoprene block copolymer is about 15 wt %.

13. A polymer as in claim 11 wherein said styrene-isoprene block copolymer is about 21 wt %.

14. A polymer as in claim 11 wherein said styrene-isoprene block copolymer is about 30 wt %.

* * * * *